J. F. STEKLEY.
HOE.
APPLICATION FILED AUG. 8, 1917. RENEWED APR. 8, 1920.
1,404,666.
Patented Jan. 24, 1922.
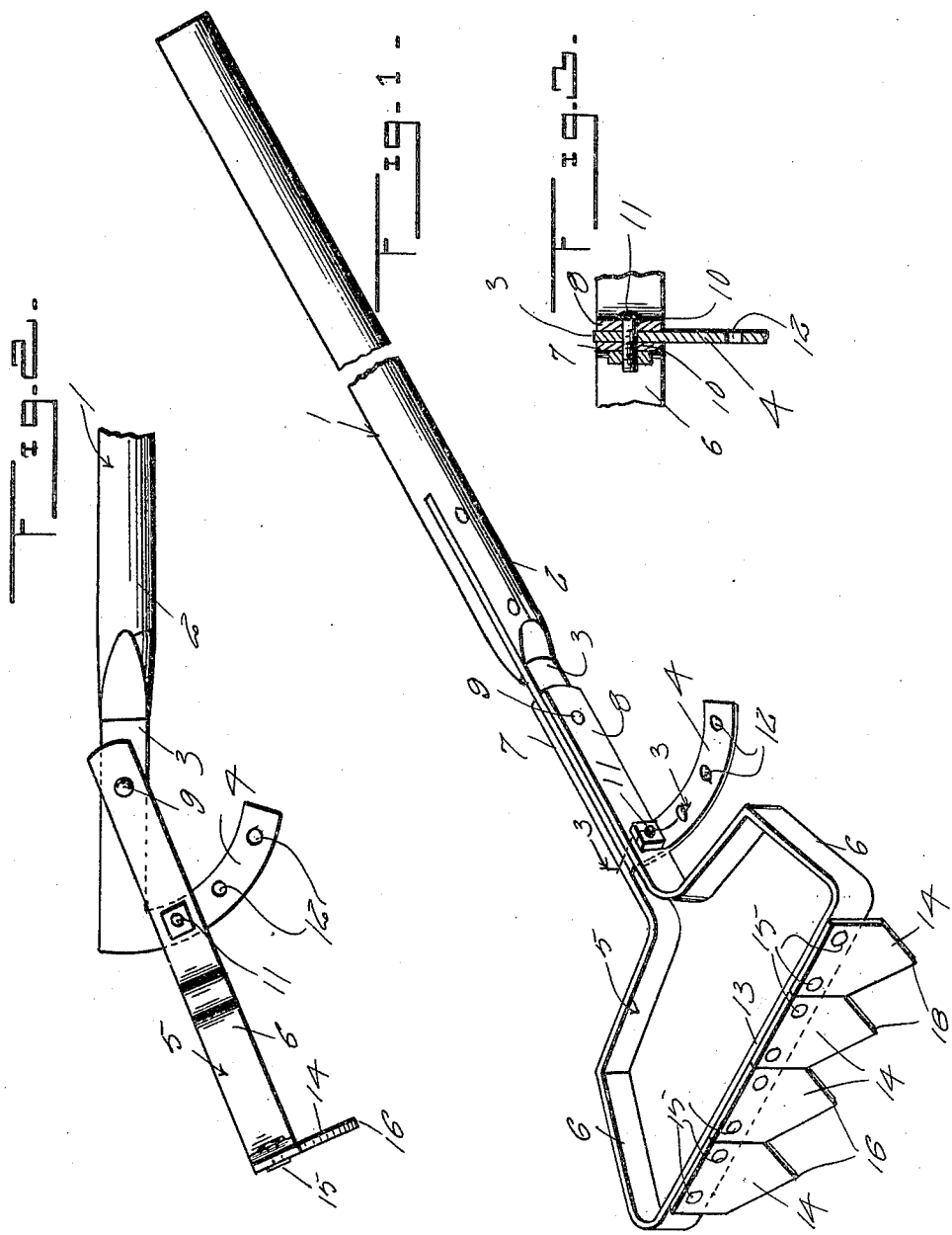

UNITED STATES PATENT OFFICE.

JOSEPH F. STEKLEY, OF GEDDES, SOUTH DAKOTA.

HOE.

1,404,666. Specification of Letters Patent. Patented Jan. 24, 1922.

Application filed August 8, 1917, Serial No. 185,196. Renewed April 3, 1920. Serial No. 372,317.

*To all whom it may concern:*

Be it known that I, JOSEPH F. STEKLEY, a citizen of the United States, residing at Geddes, in the county of Charles Mix and State of South Dakota, have invented certain new and useful Improvements in Hoes; and I do hereby declare the following to be a full, clear, and exact description of the invention, such as will enable others skilled in the art to which it appertains to make and use the same.

This invention relates to a garden implement of the hoe or weeder type, and the primary object of the invention is to provide a weeding hoe which comprises a handle section and a blade section, which blade section is pivotally connected to the handle section for positioning in various adjusted positions with respect to the handle, so that the hoe may be conveniently used by a tall or short person and also to provide means for holding the blade section in adjusted position with respect to the handle section.

A further object of this invention is to provide a blade section which is composed of a body made from a single piece of flat metal having an outer straight portion to which a plurality of pointed cutting blades are attached and which has its ends bent to form a pair of parallel attaching sections which are pivotally connected to the handle section of the weeder.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:

Figure 1 is a perspective view of the improved hoe,

Figure 2 is a fragmentary side elevation of the hoe showing the blade section in an adjusted position with respect to the handle section, and Figure 3 is a section on the line 3—3 of Figure 1.

Referring more particularly to the drawings, 1 designates the handle section as an entirety, which includes the usual type of hoe or rake handle 2 that has a blade 3 attached to its lower end. The blade 3 has an arcuate arm or segment 4 formed integrally with its outer end which curves downwardly and rearwardly towards the handle 2 as clearly shown in Figures 1 and 2 of the drawings.

The blade section is generically indicated by the numeral 5 and it comprises a body 6 which is constructed of a single piece of flat metal, bent to form a substantially rectangularly shaped portion and a pair of parallel portions 7 and 8 which are pivotally connected as shown at 9 to the blade 3. The pivot point 9 of the body 6 is at the axis of the segment or arcuate arm 4. The parallel arms 7 and 8 are provided with alining openings 10 through which a bolt 11 extends. The bolt 11 also extends through any one of the plurality of openings 12 which are formed in the arcuate arm 4 for holding the head or blade structure 5 at various adjusted positions with respect to the handle section 1, so as to properly regulate the hoe for use by either a tall or short person or for any other desired purpose.

The outer straight side 13 of the body 6 has a plurality of sections or blades 14 attached thereto by means of rivets or analogous fastening devices 15. The blades 14 have their lower ends pointed, as clearly shown at 16, providing a rake like cutting structure for dragging out or cutting weeds as well as stirring up the ground during the use of the device. Thus in effect the implement disclosed and which as described is of the hoe type, consists of handle and head elements which are adjustable relative to each other to dispose the cutting edge of the latter in different angular relations with the length of the former, one of said elements having a tongue located between and pivotally connected with the parallel spaced members of a tongue carried by the other element, and one of said tongues having an arm disposed concentric with and spaced from the pivotal point of connection of the tongues, so as to afford a brace for the other tongue in all positions of adjustment while constituting a means of anchoring the head element at the desired adjustment with reference to the length of the handle.

In reducing the invention to practice, certain minor features of construction, combination and arrangement of parts may necessitate alterations to which the patentee is entitled, provided such alterations are comprehended within the scope of what is claimed.

What is claimed is:—

An agricultural implement of the character described comprising a handle shank, an arm depending from the outer end portion of the shank, a head having rearwardly extending attaching bars disposed on opposite sides of the shank, a non-removable pivot passing snugly through the shank and bars adjacent the inner end of the shank, preventing movement of the shank and bars radially thereof, the attaching bars being provided with openings to register selectively with a plurality of openings in the depending arm of the shank, and a removable fastener cooperating with the openings of the bars and arm to releasably hold the head in an angularly adjusted position.

In testimony whereof I affix my signature in presence of two witnesses.

JOSEPH F. STEKLEY.

Witnesses:
ANTHONY J. SCHOTT,
ORLEY W. KLOCK.